Jan. 28, 1930.   R. W. BROWN   1,745,145
FULL CIRCLE RETREAD VULCANIZER
Filed Dec. 3, 1926   2 Sheets-Sheet 1
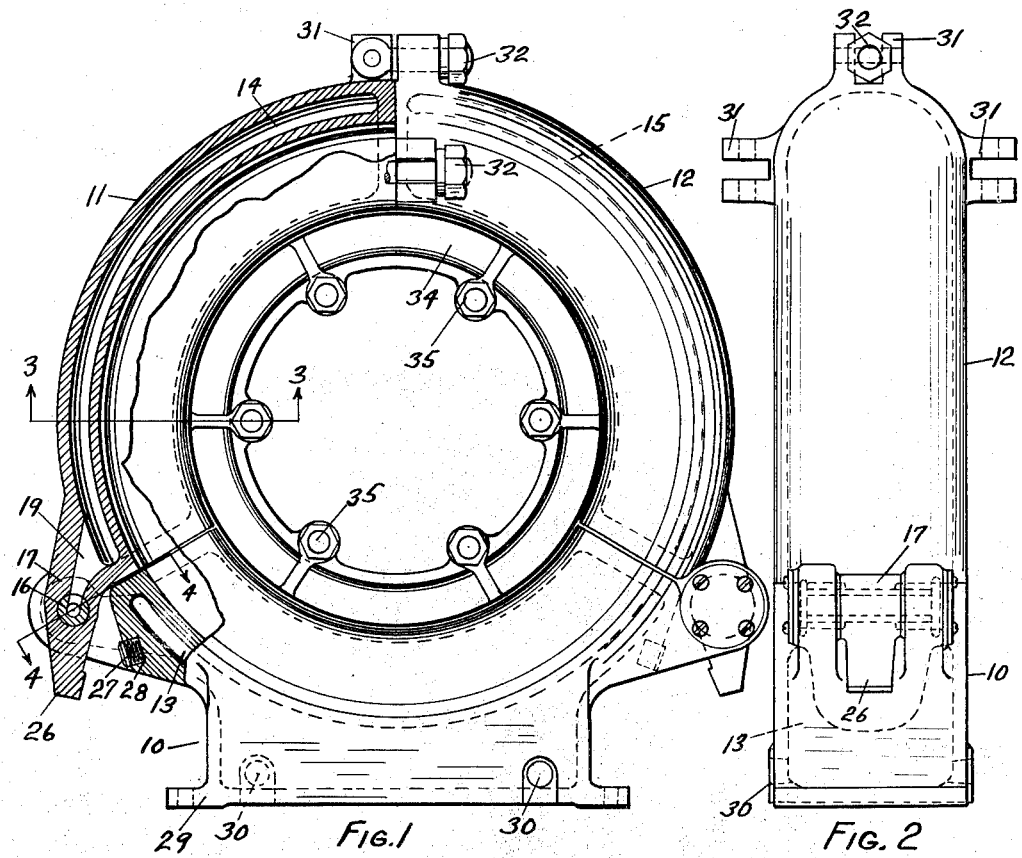
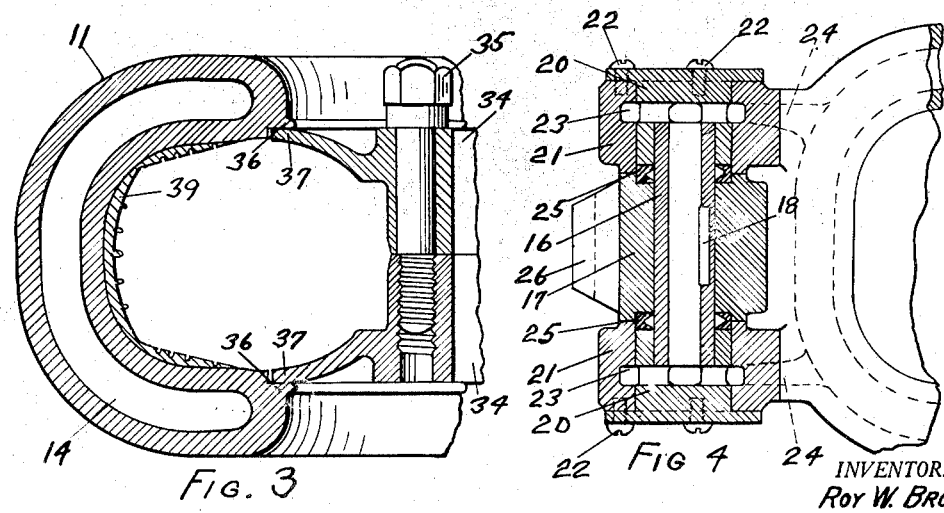
INVENTOR.
Roy W. Brown
BY Ely & Barrow
ATTORNEYS

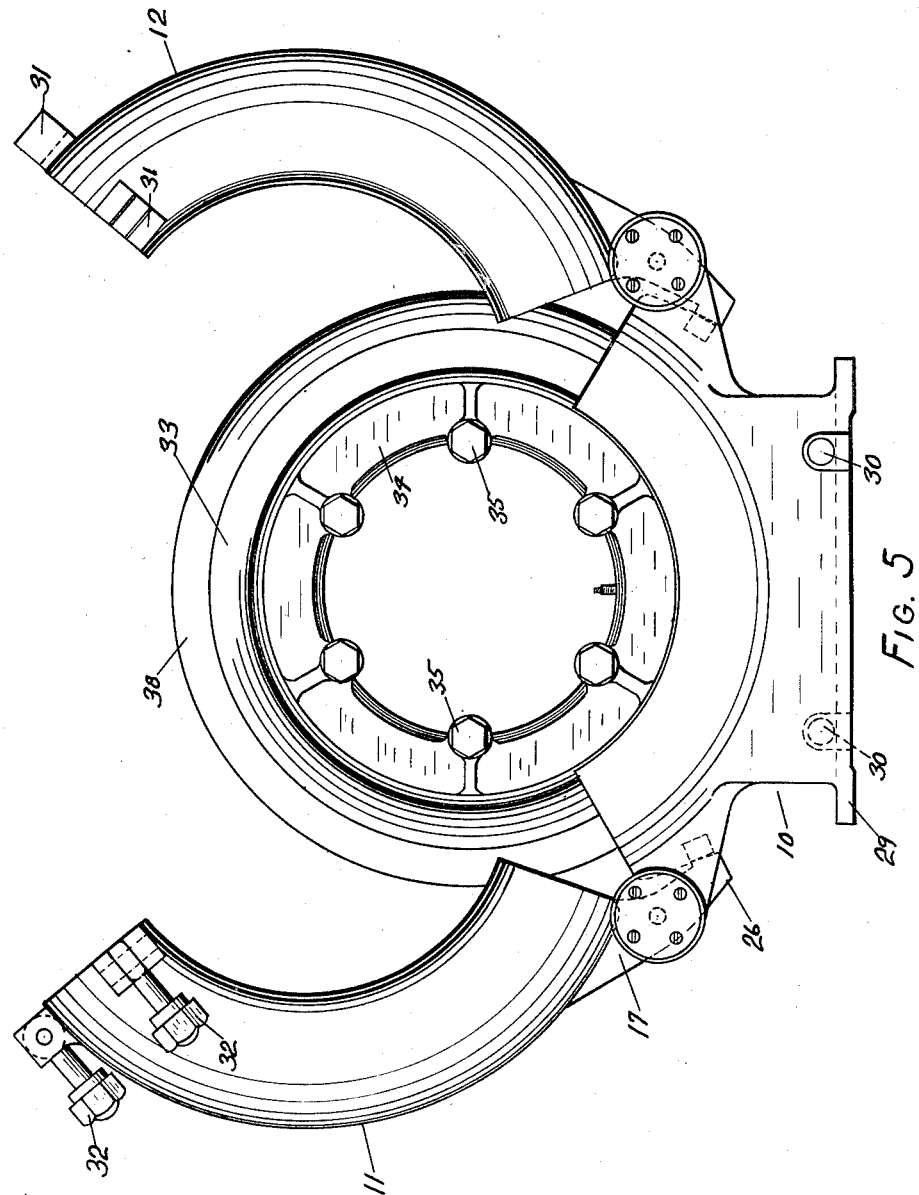

Patented Jan. 28, 1930

1,745,145

UNITED STATES PATENT OFFICE

ROY W. BROWN, OF AKRON, OHIO, ASSIGNOR TO THE FIRESTONE TIRE AND RUBBER COMPANY, OF AKRON, OHIO, A CORPORATION OF OHIO

FULL-CIRCLE RETREAD VULCANIZER

Application filed December 3, 1926. Serial No. 152,369.

This invention relates to apparatus for vulcanizing new treads on old pneumatic tire casings.

The general purpose of the invention is to provide apparatus for vulcanizing the full circumference of a new tread onto an old tire casing from which the worn tread has been removed. An object, therefore, is to provide a vulcanizer comprising an annular mold constructed of hinged segments in order that a tire casing may be readily placed therein or removed therefrom. A further object is to provide a vulcanizer comprising hinged, steam-jacketed segments and steam conduits passing through the hinges thereof, whereby all external steam pipes between the segments may be eliminated, thorough and complete drainage of the condensate obtained, and free access to the mold cavity had. Another object is to provide means for retaining an air bag in a casing placed in the vulcanizer, said means to cooperate with the hinged segments to enclose the casing completely and to radiate heat from the inner portions thereof for maintaining the sidewalls and beads at a relatively low temperature.

The foregoing and other objects are obtained by the apparatus illustrated in the accompanying drawings and described below. It is to be understood that the invention is not limited to the particular form thereof shown and described.

Of the accompanying drawings:

Figure 1 is a front elevation of apparatus embodying the invention;

Figure 2 is a side elevation thereof;

Figure 3 is an enlarged detail section taken on the line 3—3 of Figure 1;

Figure 4 is an enlarged detail section taken on the line 4—4 of Figure 1; and

Figure 5 is a side elevation of the device opened for placing a casing therein.

Referring more particularly to the drawings, 10 represents a fixed base segment of a vulcanizer and 11 and 12 are hinged segments pivoted thereto. Each of the segments 10, 11 and 12 is constructed with a hollow chamber, 13, 14 and 15 respectively, constituting a steam jacket. The hinge between segment 11 and segment 10 is also of hollow construction and comprises a tubular pintle 16 driven through a lateral apertured lug 17 projecting from segment 11 and having an aperture 18 therein in registry with a passageway 19 in communication with chamber 14. The projecting ends of pintle 16 are journaled in apertured bushings or trunnions 20, 20 housed in eyes 21, 21 projecting from segment 10 and attached thereto by screws 22. Grooves 23, 23 in eyes 21, 21 register with the apertures in bushings 20, 20 and are connected by passageways 24, 24 to chamber 13, thus establishing communication between segments 10 and 11 for the free passage of steam to chamber 14 and thorough drainage of condensate therefrom. To prevent leakage at the hinge, pressure packing gaskets 25, 25 are placed in the joint between eyes 21, 21 and lug 17. The projecting end 26 on lug 17 limits the outward pivotal movement of segment 11, as shown in Figure 5, by abutting against a spring 27 housed within recess 28 in segment 10. The hinge between segment 12 and segment 10 is constructed identically to the hinge above described.

Fixed segment 10 is provided with a base portion 29 for mounting the vulcanizer and with ports 30, 30 for connection with steam supply and condensate drainage lines (not shown). Lugs 31 are provided adjacent the abutting ends of segments 11 and 12 for mounting clamping bolts 32, 32.

In order that the tire casing 33 may be completely enclosed when an air bag (not shown) is employed in the vulcanizing operation, rings 34, 34 are mounted around the casing from the opposite sides thereof and bolted together with bolts 35. Flanges 36, 36 on the vulcanizer segments overlap flanges 37, 37 on rings 34, 34 when the casing is clamped therein. An additional function of rings 34, 34 is the radiation of heat from the side walls and beads of casing 33 in order that these portions of the casing may not become overcured by the heat necessary to cure the new tread 38. Rings 34, 34 may be dispensed with if desired when a solid core is used.

Liner plate segments, one of which is denoted by numeral 39 in Figure 3, snugly fit the interior of the vulcanizer segments and are interchangeable for molding different tread designs on the casing and for adapting the apparatus for use with different sized casings.

The operation of the apparatus in the vulcanization of new treads on worn casings will be readily understood from the above description and need not be further set forth.

Modifications of the above described invention may be resorted to without departing from the spirit thereof or the scope of the appended claims.

What is claimed is:

1. An annular retread vulcanizer for tire casings, comprising a fixed segment and a pair of hinged segments pivoted thereto and adapted when swung open to permit the placing of a tire casing within said vulcanizer, a steam chamber in each hinged segment connected by a passageway to a hollow pintle journaled in apertured bushings, eyes projecting from the fixed segment and carrying said bushings, said eyes having grooves therein connected by a passageway to the steam chamber in said fixed segment, whereby a continuous conduit is formed through the hinges connecting the hinged segments to the fixed segment so that communication may be established therethrough for the free passage of steam and drainage of condensate, and bolts for clamping said hinged segments together.

2. An annular retread vulcanizer for tire casings, comprising a fixed segment and a pair of hinged segments pivoted thereto and adapted when swung open to permit the placing of a tire casing within said vulcanizer, and a steam chamber in each hinged segment connected by a passageway to a hollow hinge, in turn connected by a passageway to the steam chamber in said fixed segment, whereby a continuous conduit is formed through the hinges connecting the hinged segments to the fixed segment so that communication may be established therethrough for the free passage of steam and drainage of condensate.

3. An annular retread vulcanizer for tire casings, comprising a fixed segment and a pair of hinged segments pivoted thereto and adapted when swung open to permit the placing of a tire casing within said vulcanizer, a steam chamber in each hinged segment connected by a passageway to a tubular pin carried by said segment, and apertured trunnions on which said pin is pivoted, said trunnions being attached to said fixed segment and being connected by a passageway to the steam chamber in said fixed segment, whereby a continuous conduit is formed through the hinges connecting the hinged segments to the fixed segment.

4. The combination of an annular repair vulcanizer formed of a plurality of steam-jacketed segments and hinges for connecting said segments and for establishing communication between the steam jackets therein, said hinges comprising eyes on one segment, said eyes having passageways therein to the steam jacket in said segment, an apertured lug on an adjacent segment, said lug being positioned between said eyes and having its aperture in alignment therewith, said aperture being connected by a passageway to the steam jacket in said last-named segment, and a tubular pin passing through said eyes and said lug, said pin having a central lateral aperture communicating with the passageway in said lug and having its open ends in communication with the passageways in said eyes.

5. An annular vulcanizer comprising a fixed segment, pivoted segments hinged at the lower end thereof to the upper end of said fixed segment, said segments having hollow chambers therein constituting steam jackets, and hollow hinges connecting said segments and having a conduit passing therethrough for establishing communication between said steam jackets.

6. An annular vulcanizer adapted to be supported in a vertical plane and comprising a lower fixed segment, a pair of upper segments hinged at their lowermost portions, one to each side of said fixed segment, and extending to a parting plane adjacent the uppermost portion of said vulcanizer, and means affording the free passage of steam and condensate from one segment to an adjacent segment.

7. In a vulcanizer, the combination of an outer annular heating and molding element formed of a lower fixed segment and a pair of pivoted segments, one hinged to each side of said fixed segment and adapted completely to surround the outer peripheral portion of a hollow annular article to be placed in said vulcanizer, and an inner annular member adapted to surround the inner peripheral portions of said article and cooperating with said outer molding element for completely enclosing said article whereby air pressure may be used therein.

ROY W. BROWN.